United States Patent [19]
Notaro et al.

[11] Patent Number: 5,360,304
[45] Date of Patent: Nov. 1, 1994

[54] FASTENER CONSTRUCTION

[75] Inventors: David F. Notaro, Amherst; David A. Hogrewe, Jr., Grand Island, both of N.Y.

[73] Assignee: McGard, Inc., New York, N.Y.

[21] Appl. No.: 60,223

[22] Filed: May 11, 1993

[51] Int. Cl.⁵ .................. F16B 37/08; F16B 37/14
[52] U.S. Cl. .................. 411/432; 411/383; 411/377; 411/431; 81/125
[58] Field of Search .............. 411/373, 377, 383, 429, 411/431, 432, 910, 919; 81/125

[56] References Cited

U.S. PATENT DOCUMENTS

| | | |
|---|---|---|
| 1,447,564 | 3/1923 | Norlund et al. |
| 2,588,372 | 3/1952 | Erb .................. 411/432 |
| 2,833,548 | 5/1958 | Clark .................. 81/125 |
| 3,960,047 | 6/1976 | Liffick .................. 411/429 |
| 4,710,082 | 12/1987 | Curtis .................. 411/429 |
| 4,726,723 | 2/1988 | Bainbridge .................. 411/432 |
| 4,784,555 | 11/1988 | Cantrell .................. 411/910 |
| 4,897,008 | 1/1990 | Parks .................. 411/432 |
| 5,112,176 | 5/1992 | McCauley .................. 411/910 |

FOREIGN PATENT DOCUMENTS

| | | | |
|---|---|---|---|
| 153487 | 9/1985 | European Pat. Off. | 411/429 |
| 2095356 | 9/1982 | United Kingdom | 411/910 |
| 2186936 | 8/1987 | United Kingdom | 411/910 |

*Primary Examiner*—Flemming Saether
*Attorney, Agent, or Firm*—Joseph P. Gastel

[57] ABSTRACT

A locknut including a body having a stud receiving inner surface and an outer surface having a ridge with a shoulder and a cylindrical portion next to the shoulder, an O-ring mounted on the cylindrical portion, a shroud having a cylindrical portion which overlies the cylindrical portion of the nut and engages the O-ring on the cylindrical portion of the nut and conceals it when a shoulder on the cylindrical portion of the shroud is in engagement with the shoulder on the ridge of the nut. The cylindrical portion of the nut has an axial length which is greater than the cylindrical portion of the shroud so that the end of the nut protrudes beyond the end of the shroud when the above-mentioned shoulders are in engagement. A bolt having a head containing structure such as described above relative to the locknut.

13 Claims, 2 Drawing Sheets

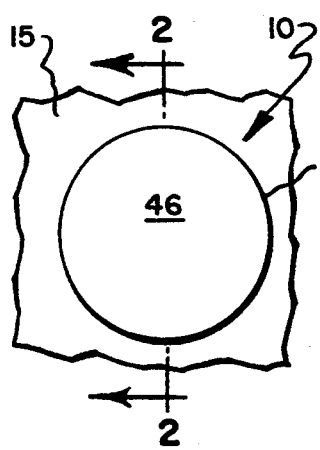
Fig. 1.
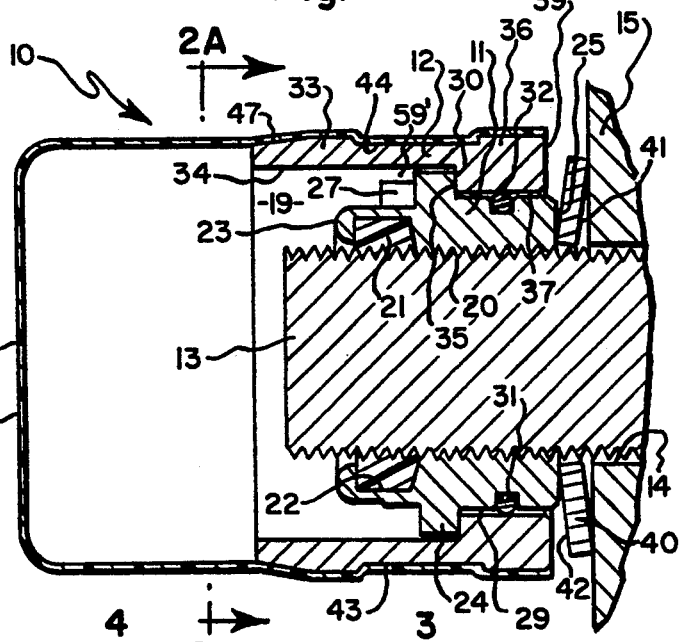
Fig. 2.
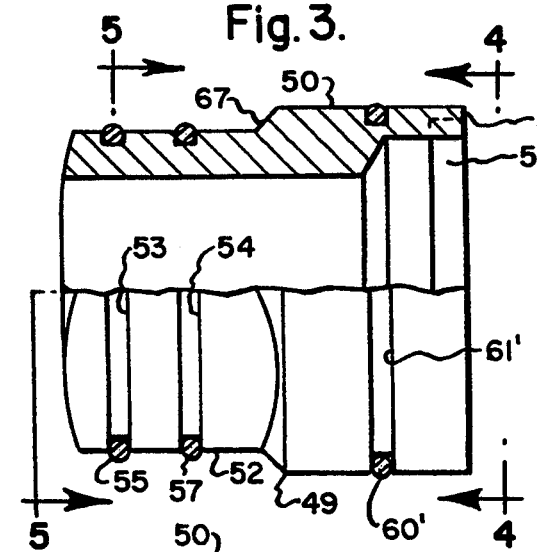
Fig. 3.
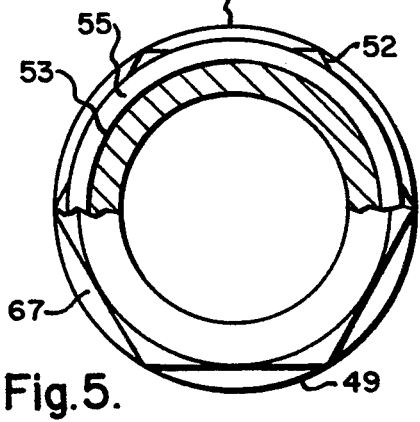
Fig. 5.
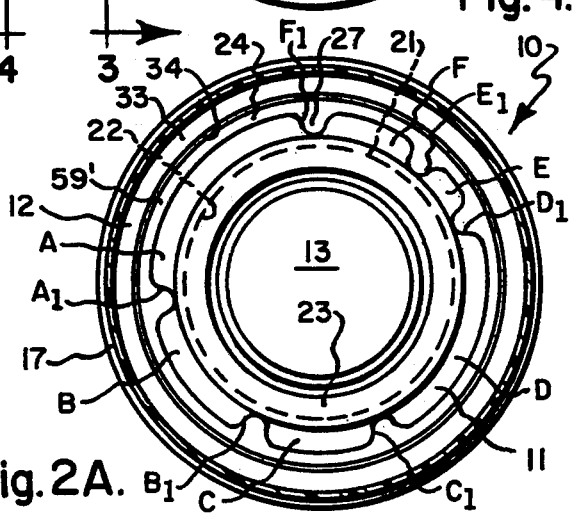
Fig. 4.
Fig. 2A.

FASTENER CONSTRUCTION

BACKGROUND OF THE INVENTION

The present invention relates to an improved anti-theft fastener construction which can be used on nuts and bolt heads, and it also relates to an improved key structure therefor.

By way of background, an anti-tamper nut is disclosed in U.S. Pat. No. 4,897,008. The structures of the present invention possess advantages over the structure shown in the foregoing patent.

SUMMARY OF THE INVENTION

It is one object of the present invention to provide an improved fastener construction, in the nature of a locknut or bolt, each having a shrouded key-receiving portion wherein the shroud is retained in assembled relationship with the key-receiving portion by a concealed O-ring located between bearing surfaces of the shroud and the key-receiving portion on which it is mounted before it is installed in its operating environment, said concealed O-ring also serving to permit the shroud to be turned without turning the locknut or bolt and also serving to prevent rattling of said shroud due to vibration after it is installed.

Another object of the present invention is to provide a key for turning the fastener, the key having structure thereon for retaining it in a plurality of different types of wrenches which may be applied thereto. Other objects and attendant advantages of the present invention will readily be perceived hereafter.

The present invention relates to a fastener member comprising a fastener portion having an outer surface, first and second ends on said fastener portion, a first ridge extending outwardly from said outer surface of said fastener portion between said first and second ends, a first shoulder on said first ridge, an outer cylindrical portion on said outer surface of said fastener portion between said first end and said first shoulder on said first ridge, a groove in said outer cylindrical portion, an O-ring in said groove, an annular shroud having an inner surface and an outer surface, first and second ends on said annular shroud, a second ridge on said annular shroud extending inwardly from said inner surface of said shroud proximate said first end of said shroud, a second shoulder on said second ridge for engaging said first shoulder, an inner cylindrical portion on said second ridge, said inner cylindrical portion being of larger diameter than said outer cylindrical portion of said fastener portion for rotatably receiving said outer cylindrical portion when said first and second shoulders are in engagement, said fastener portion having a first axial length between said first end thereof and said first shoulder, said shroud having a second axial length which is less than said first axial length between said second shoulder and said first end of said shroud to thereby permit said first end of said fastener portion to protrude beyond said first end of said shroud when said first and second shoulders are in engagement, a key-receiving configuration on said second end of said fastener portion, said second end of said shroud extending beyond said second end of said fastener portion, said O-ring having an outer diameter which is larger than said inner diameter of said inner cylindrical portion of said second ridge to thereby provide an interference fit therebetween to retain said fastener portion and said shroud in assembled relationship and to permit said shroud to be physically rotated relative to said fastener portion while preventing rotational movement of said shroud relative to said fastener portion due to vibration, said groove being located within the axial space defined by said second ridge and thereby being wholly concealed within said shroud when said first and second shoulders are in engagement.

The present invention will be more fully understood when the following portions of the specification are read in conjunction with the accompanying drawings wherein:

BRIEF DESCRIPTION OF THE DRAWINGS

FIG. 1 is a fragmentary front elevational view of the improved locknut mounted on a foreign body, such as a propeller;

FIG. 2 is an enlarged fragmentary cross sectional view taken substantially along line 2—2 of FIG. 1 and showing the locknut mounted on an associated stud;

FIG. 2A is a cross sectional view taken substantially along line 2A—2A of FIG. 2;

FIG. 3 is a fragmentary side elevational view, partially in cross section, of a key which is used to install and remove the locknut of FIG. 2;

FIG. 4 is an end elevational view taken substantially in the direction of arrows 4—4 of FIG. 3 and showing the configuration of the key;

FIG. 5 is a view, partially in cross section, taken substantially in the direction of arrows 5—5 of FIG. 3;

DESCRIPTION OF THE PREFERRED EMBODIMENTS

Figure 6:
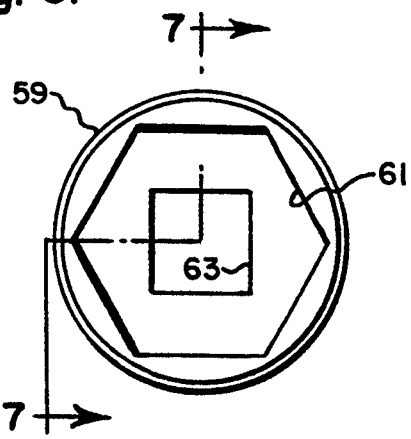
FIG. 6 is an end view of a six-point wrench which is used to turn the ky of FIGS. 3-5.

Summarizing in advance, the improved locknut assembly 10 includes a locknut body 11 having a rotatable shroud 12 thereon. The locknut body 11 is threadably mounted on a stud 13 which protrudes through opening 14 in a foreign body, such as a propeller 15. A plastic cap 17 is mounted on shroud 12 to prevent entry of foreign matter into space 19 between shroud 12 and locknut body 11.

The locknut body 11 includes a threaded portion 20 on its inner surface. It also includes annular plastic insert 21 which is held in annular space 22 by peened end portion 23. An annular ridge 24 is located between the end 25 and peened portion 23. A key-receiving configuration 27 is located at the side of annular ridge 24, and it includes a plurality of lobes A, B, C, D, E and F having grooves $A_1$, $B_1$, $C_1$, $D_1$, $E_1$ and $F_1$ therebetween. A cylindrical portion 29 of less diameter than ridge 24 is located between end 25 and ridge 24. An annular shoulder 30 is located on ridge 24 at its junction with cylindrical portion 29. An O-ring groove 31 is located in cylindrical portion 29, and it carries an O-ring 32. O-ring groove 31 constitutes a small portion of the axial expanse of cylindrical portion 29.

The shroud 12 includes a cylindrical annular portion 33 having an inner surface 34 which is of larger diameter than the outer diameter of locknut body ridge 24 so that the locknut body 11 can be inserted from left to right in FIG. 2 to the position shown wherein its shoulder 30 abuts shoulder 35 of shroud 12. Shoulder 35 is located on annular portion 36 having an inner diameter which is less than the outer diameter of locknut body ridge 24. The axial length of cylindrical portion 29 of locknut body 11, that is, its length between shoulder 30 and its end 25 is slightly longer than the axial length of the cylindrical inner surface 37 which is located on annular portion 36 between shroud shoulder 35 and shroud end 39. Thus, the locknut end 25 will extend slightly beyond the end 39 of shroud 12 when the parts in the position shown in FIG. 2 with shoulders 30 and 35 in engagement.

There is a slight clearance between cylindrical shroud surface 37 and cylindrical locknut surface 29 to permit an easy fit therebetween while still providing bearing therebetween. In other words, the diameter of shroud surface 37 is slightly larger than the diameter of locknut surface 29. The O-ring 32, however, when mounted in groove 31, is of a larger diameter than the inner cylindrical diameter of surface 37. Thus, there is an interference fit therebetween. This interference fit provides a plurality of advantages, namely, it permits the shroud 12 and locknut body 11 to be maintained in assembled condition when assembly 10 is not mounted on a stud. It also prevents the shroud 12 from vibrating relative to locknut body 11 when the locknut assembly 10 is subjected to vibrational forces. Also, O-ring 32 permits shroud 12 to be rotated in the event a wrench is applied thereto without such rotation being transmitted to locknut body 11, thereby providing an anti-theft characteristic to the locknut assembly. In addition to the foregoing advantages, there is the additional advantage that the O-ring groove 31 constitutes a small percentage of the axial expanse of inner cylindrical surface 37 of shroud 12, and thus there is a relatively large bearing area between locknut surface 29 and shroud surface 37 which provides stability between locknut 11 and shroud 12. In addition, since O-ring 32 is concealed because shroud surface 37 overlies it, it is not subject to deterioration from sunlight, nor is it exposed so that it can be damaged by foreign objects, nor is it accessible so that it can be jimmied. O-ring 32 also acts as a seal to prevent foreign matter from passing beyond it from end 25 of the locknut body 11.

In use, when the locknut-shroud assembly 11-12 is threaded onto stud 13, the stud will tap plastic insert 21 and this constitutes a known means for locking locknut body 11 to stud 13. In addition, the locknut assembly 10 includes a Belleville washer 40 having a concave face 41 and a convex face 42. The locknut end 25 bears against the convex face 42 to thus provide further resistance against loosening of locknut assembly 10 due to vibration of part 15 on which it is mounted.

A cylindrical cap 17 is mounted on shroud 12 to prevent foreign matter and debris from entering space 19. Cap 17 has a closed end 46 and an open end. To insure retention of cap 17 on shroud 12, shroud 12 has a shallow groove 43 therein which receives internal ridge 44 of cap 17. In addition, there is a very slight chamfer 47 at the end of shroud 12 to facilitate slipping of the open end of cap 17 onto shroud 12. The cap is made out of a suitable flexible plastic, such as polyethylene.

Figure 8:
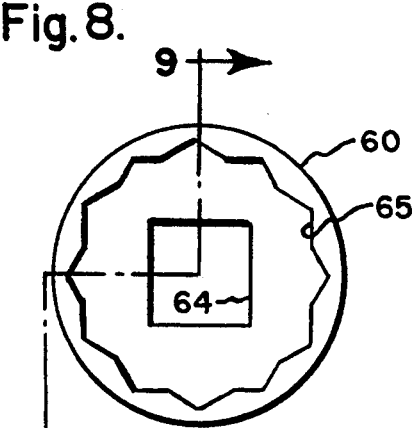
FIG. 8 is an end elevational view of a twelve-point wrench which is utilized to turn the key of FIGS. 3-5.
Figure 7:
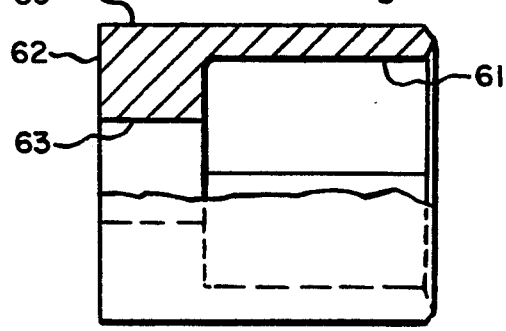
FIG. 7 is a fragmentary cross sectional view taken substantially along line 7—7 of FIG. 6.
Figure 9:
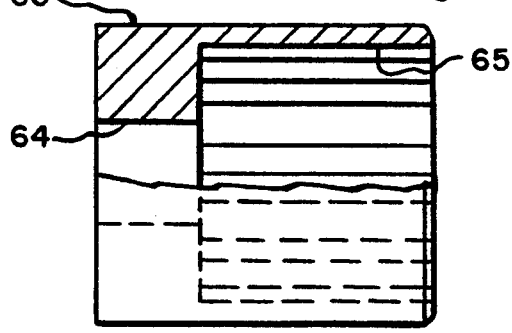
FIG. 9 is a fragmentary cross sectional view taken substantially along line 9—9 of FIG. 8.

A key 49 is provided for installing and removing locknut body 11 from stud 13, and when it is removed, shroud 12 will come with it because it is connected thereto by O-ring 32. Key 49 includes an enlarged cylindrical portion 50 having an internal key configuration 51 with lobes and grooves which match the key-receiving configuration 27 of locknut body 11. In the interest of brevity, these will not be described but it will be appreciated that the lobes, such as 52' and 53' fit into the grooves, such as $A_1$ and $B_1$, of the key-receiving portion 27, and the grooves, such as 54' and 55', receive the lobes, such as A and B, of key-receiving portion 27. A rim 57' is received in the space 59' between shroud 12 and locknut body 11. An O-ring 60' is optionally located in groove 61' for retaining key 49 within a shroud 12 into which it is inserted. Key 49 has a hexagonal portion 52 thereon with grooves 53 and 54 therein which contain O-rings 55 and 57, respectively. Hexagonal portion 52, which terminates at shoulder 67, can receive either a six-point hexagonal wrench 59 (FIGS. 6 and 7) or a twelve-point hexagonal wrench 60 (FIGS. 8 and 9). Six-point wrench 59 has an internal surface 61 which is to be mounted on key portion 52. The end 62 of wrench 59 has a square hole 63 therein for receiving the driving portion of a suitable member, such as a handle or a drive motor, as is well known. When the six-point wrench 59 is installed on hexagonal key portion 52, it will normally only go slightly beyond O-ring 55, but if it makes a loose fit, it may go as far as O-ring 57. Wrench 59 can thus be retained on key portion 52 because of its frictional engagement with O-ring 55. The twelve-point wrench 60 also includes a square opening 64 which receives the driving end of a suitable wrench turning tool. The twelve-point wrench has an internal surface 65 which mounts onto the hexagonal end 52 of key 49. However, because it effectively has a larger diameter than the six-point wrench 59, it will fit loosely over O-ring 55 and will not maintain a fastening engagement with key end 52 until it engages O-ring 57 which is of slightly larger diameter than O-ring 55. When the twelve-point wrench 60 is mounted on key portion 52, its end will abut tapered shoulder 67.

In an actual locknut, the locknut body 11 was fabricated of brass and the shroud 12 was fabricated of stainless steel. The O-ring groove 31 was approximately one-fifth the width of the cylindrical portion 29. More specifically, portion 29 was 0.340 inches long, and the O-ring groove 31 was 0.075 inches, and the nearest side of O-ring groove from shoulder 30 was 0.125 inches. Therefore, the O-ring groove was approximately at the center of cylindrical portion 29 of the locknut body. The dimension of the inner cylindrical surface 37 of shroud 12 was 0.313 inches, and groove 31 was spaced 0.125 inches from shoulder 30. Therefore, O-ring 32 was located at the approximate middle of inner cylindrical surface 37 when shoulders 30 and 35 were in engagement. In this location, the O-ring 32 was well concealed. The O-ring had an outer diameter of 1.075 inches.

Figure 10:
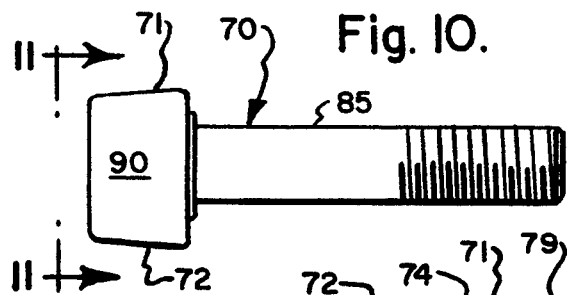
FIG. 10 is a side elevational view of a bolt which has an anti-tamper head containing structure which is analogous to the shrouded locknut of FIG. 2.
Figure 11:
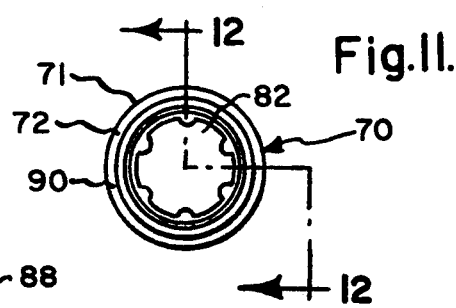
FIG. 11 is an end elevational view taken substantially in the direction of arrows 11—11 of FIG. 10.
Figure 12:
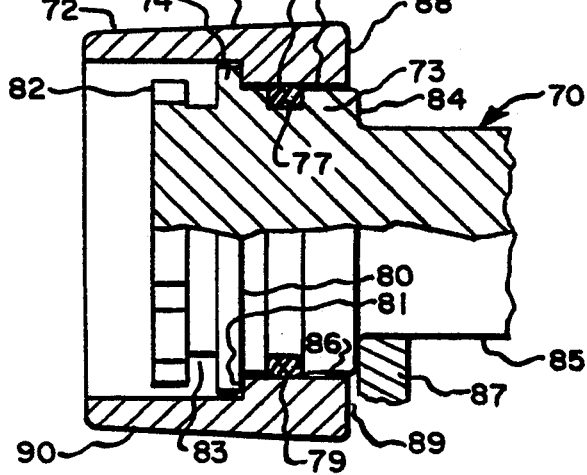
FIG. 12 is a fragmentary enlarged view, partially in cross section, taken substantially along line 12—12 of FIG. 11.

In FIGS. 10, 11 and 12 a bolt 70 is shown which has a head 72 having a shroud 71 which is mounted on head portion 73 in substantially the same manner as shroud 12 is mounted on locknut body 11. More specifically, the head portion 73 includes a cylindrical ridge 74 which is of larger diameter than cylindrical portion 75 which has groove 77 carrying O-ring 79. A shoulder 80 on ridge 74 is abutted by shoulder 81 of shroud 71. A key-receiving configuration 82 is located at the outer end of bolt head 73, and a groove 83 is located between key-receiving configuration 82 and ridge 74. Key-receiving configuration 82 is analogous to key-receiving configuration 27 of locknut body 11. A shoulder 84 is located between the shank 85 and head 73 for bearing on an object 87 into which bolt 70 is placed. The cylindrical portion 75 is of greater axial length than cylindrical portion 86 between shoulder 81 and the end 88 of the shroud. Thus, there will be a space 89 between the object 87 and the end of shroud 71 when shoulders 80 and 81 are in engagement. Therefore, shroud 71 can be turned on bolt head 73. The relationship between the shroud 71 and bolt head 73 is the same as the relationship between locknut body 11 and shroud 12 of FIG. 2, and thus all of the advantages enumerated above relative to the structure of FIG. 2 is equally applicable to the structure of FIG. 12. In addition, it is to be noted that the outer surface 90 of shroud 71 is frustoconical so that it will not receive a wrench in effective turning relationship. It will be appreciated that a Belleville washer, such as 40, can be used in conjunction with bolt 70.

It will be appreciated that the key structure described above relative to the locknut assembly 10 can also be used relative to the bolt structure 70.

While preferred embodiments of the present invention have been described above, it will be appreciated that the present invention is not limited thereto but may be otherwise embodied within the scope of the following claims.

What is claimed is:

1. A locknut comprising an annular locknut body having an inner surface and an outer surface, first and second ends on said locknut body, means on said inner surface for engaging a stud in mounted relationship, a first ridge extending outwardly from said outer surface of said locknut body between said first and second ends, a first shoulder on said first ridge, an outer cylindrical portion on said outer surface of said locknut body between said first end and said first shoulder on said first ridge, a groove in said outer cylindrical portion, an O-ring in said groove, an annular shroud having an inner surface and an outer surface, first and second ends on said annular shroud, a second ridge on said annular shroud extending inwardly from said inner surface of said shroud proximate said first end of said shroud, a second shoulder on said second ridge for engaging said first shoulder, an axially extending inner portion on said second ridge, said inner cylindrical portion being of larger diameter than said outer cylindrical portion of said locknut body for rotatably receiving said outer cylindrical portion when said first and second shoulders are in engagement, said locknut body having a first axial length between said first end thereof and said first shoulder, said shroud having a second axial length which is less than said first axial length between said second shoulder and said first end of said shroud to thereby permit said first end of said locknut to protrude beyond said first end of said shroud when said first and second shoulders are in engagement, a key-receiving configuration on said second end of said locknut body, said second end of said shroud extending beyond said second end of said locknut body, said O-ring having an outer diameter which is larger than said inner diameter of said inner cylindrical portion of said second ridge to thereby engage said inner cylindrical portion to provide an interference fit therebetween to retain said locknut body and said shroud in assembled relationship when said locknut body is not mounted on said lug and to permit said shroud to be physically rotated relative to said locknut body when said locknut body is mounted on said stud while preventing rotational movement of said shroud relative to said locknut body due to vibration, said groove being located within the axial extent of said inner cylindrical portion thereby being wholly concealed within said shroud when said first and second shoulders are in engagement.

2. A locknut as set forth in claim 1 wherein said O-ring and said groove have an axial length which is a small percentage of the axial length of said outer cylindrical portion thereby permitting the existence of a bearing area between said inner axial length of said inner cylindrical portion of said second ridge.

3. A locknut as set forth in claim 1 including a washer with a concave face and a convex face with its convex face positioned in contiguous relationship to said first end of said locknut body when said locknut is mounted on said stud.

4. A locknut as set forth in claim 1 including a self-threading annular plastic insert mounted on said inner surface of said locknut body proximate said second end thereof for locking said locknut on said stud.

5. A locknut as set forth in claim 1 including a shallow groove on said outer surface of said annular shroud, a substantially cylindrical cap having an open end and a closed end and an inner surface, and a ridge extending inwardly from said inner surface of said cylindrical cap for mating engagement with said shallow groove for retaining said cap on said shroud.

6. A locknut as set forth in claim 5 wherein said open end is substantially flush with said first end of said annular shroud when said ridge on said cap is in said shallow groove.

7. A locknut as set forth in claim 1 including a key therefor, said first and second ends on said key, key means on said first end of said key for being received by said key-receiving configuration for turning said locknut, an outer surface on said key, first and second spaced grooves on said outer surface of said key between said first and second ends thereof, and first and second O-rings in said first and second grooves, respectively, for retaining wrenches having different structures.

8. A locknut as set forth in claim 7 wherein said grooves are located on a hexagonal portion of said outer surface of said key.

9. A locknut as set forth in claim 8 wherein said wrenches of different structures are six-point and twelve-point wrenches.

10. A bolt comprising a shank, a head on said shank, said head including an outer surface, first and second ends on said head, said first end being proximate said shank and said second end being remote from said shank, a first ridge extending outwardly from said outer surface of said head between said first and second ends, a first shoulder on said first ridge, an outer cylindrical portion on said outer surface of said head between said first end and said first shoulder on said first ridge, a groove in said outer cylindrical portion, an O-ring in said groove, an annular shroud having an inner surface and an outer surface, first and second ends on said annular shroud, a second ridge on said annular shroud extending inwardly from said inner surface of said shroud proximate said first end of said shroud, a second shoulder on said second ridge for engaging said first shoulder, an axially extending inner cylindrical portion on said second ridge, said inner cylindrical portion being of larger diameter than said outer cylindrical portion of said head for rotatably receiving said outer cylindrical portion when said first and second shoulders are in engagement, said head having a first axial length between said first end thereof and said first shoulder, said shroud having a second axial length which is less than said first axial length between said second shoulder and said first end of said shroud to thereby permit said first end of said head to protrude beyond said first end of said shroud when said first and second shoulders are in engagement, a key-receiving configuration on said second end of said head, said second end of said shroud extending beyond said second end of said head, said O-ring having an outer diameter which is larger than said inner diameter of said inner cylindrical portion of said second ridge to thereby engage said inner cylindrical portion to provide an interference fit between to retain said head and said shroud in assembled relationship when said bolt is not mounted on a body and to permit said shroud to be physically rotated relative to said head when said bolt is mounted on said body with said first end of said head in engagement with said body while preventing rotational movement of said shroud relative to said head due to vibration, said groove being located within the axial extent of said inner cylindrical portion thereby being wholly concealed within said shroud when said first and second shoulders are in engagement.

11. A bolt as set forth in claim 10 wherein said O-ring and said groove have an axial length which is a small percentage of the axial length of outer said cylindrical portion thereby permitting the existence of a bearing area between said inner and outer cylindrical portions which is substantially the axial length of said inner cylindrical portion of said second ridge.

12. A fastener member comprising a fastener portion having an outer surface, first and second ends on said fastener portion, a first ridge extending outwardly from said outer surface of said fastener portion between said first and second ends, a first shoulder on said first ridge, an outer cylindrical portion on said outer surface of said fastener portion between said first end and said first shoulder on said first ridge, a groove in said outer cylindrical portion, an O-ring in said groove, an annular shroud having an inner surface and an outer surface, first and second ends on said annular shroud, a second ridge on said annular shroud extending inwardly from said inner surface of said shroud proximate said first end of said shroud, a second shoulder on said second ridge for engaging said first shoulder, an axially extending inner cylindrical portion on said second ridge, said inner cylindrical portion being of larger diameter than said outer cylindrical portion of said fastener portion for rotatably receiving said outer cylindrical portion when said first and second shoulders are in engagement, said fastener portion having a first axial length between said first end thereof and said first shoulder, said shroud having a second axial length which is less than said first axial length between said second shoulder and said first end of said shroud to thereby permit said first end of said fastener portion to protrude beyond said first end of said shroud when said first and second shoulders are in engagement, a key-receiving configuration on said second end of said fastener portion, said second end of said shroud extending beyond said second end of said fastener portion, said O-ring having an outer diameter which is larger than said inner diameter of said inner cylindrical portion of said second ridge to thereby engage said inner cylindrical portion to provide an interference fit therebetween to retain said fastener portion and said shroud in assembled relationship and to permit said shroud to be physically rotated relative to said fastener portion while preventing rotational movement of said shroud relative to said fastener portion due to vibration, said groove being located within the axial extent of said inner cylindrical portion thereby being wholly concealed within said shroud when said first and second shoulders are in engagement.

13. A fastener member as set forth in claim 12 wherein said O-ring and said groove have an axial length which is a small percentage of the axial length of said outer cylindrical portion thereby permitting the existence of a bearing area between said inner and outer cylindrical portions which is substantially the entire axial length of said inner cylindrical portion of said second ridge.

* * * * *

UNITED STATES PATENT AND TRADEMARK OFFICE
CERTIFICATE OF CORRECTION

PATENT NO. : 5,360,304
DATED : November 1, 1994
INVENTOR(S) : David F. Notaro et al It is certified that error appears in the above-indentified patent and that said Letters Patent is hereby corrected as shown below:

Column 5, line 50 (claim 1), after "inner" insert
--cylindrical--.

Column 6, line 16 (claim 2), after "inner" insert --and outer
cylindrical portions which is substantially the--.

Column 7, line 20 (claim 10), change "between" to
--therebetween--.

Column 8, line 42 (claim 13), cancel "entire".

Signed and Sealed this

Twenty-seventh Day of December, 1994

Attest:

BRUCE LEHMAN

*Attesting Officer*          *Commissioner of Patents and Trademarks*